United States Patent [19]

Hongo

[11] Patent Number: 4,887,303

[45] Date of Patent: Dec. 12, 1989

[54] CHARACTER READING METHOD

[75] Inventor: Yasuo Hongo, Tokyo, Japan

[73] Assignee: Fuji Electric Co., Ltd., Kawasaki, Japan

[21] Appl. No.: 310,488

[22] Filed: Feb. 14, 1989

Related U.S. Application Data

[63] Continuation of Ser. No. 48,668, May 11, 1987, abandoned.

[30] Foreign Application Priority Data

May 16, 1986 [JP] Japan ................................ 61-110682

[51] Int. Cl.$^4$ ............................................... G06K 9/00
[52] U.S. Cl. .......................................... 382/34; 382/25; 382/27
[58] Field of Search .............................. 382/25, 27, 34

[56] References Cited

U.S. PATENT DOCUMENTS

| | | | |
|---|---|---|---|
| 4,308,523 | 12/1981 | Schapira | 382/34 |
| 4,556,985 | 12/1985 | Hongo | 382/34 |
| 4,628,533 | 12/1986 | Hongo et al. | 382/27 |
| 4,630,308 | 12/1986 | Hongo | 382/27 |

Primary Examiner—Leo H. Boudreau
Attorney, Agent, or Firm—Brumbaugh, Graves, Donohue & Raymond

[57] ABSTRACT

The identity of an unknown character is determined by comparing matrices representing the unknown character with matrices representing known dictionary characters and determining the deviation between matrices for the unknown and the dictionary characters. By obtaining both matrices for the character and for the background surroundings of the character, it is possible to extract small differences between local portions of the character. The dictionary pattern of each character is automatically created by "learning" and also the features of the character at the time of judgment and the related result are totalized so that the dictionary pattern can be created from the complementary cumulative matrices obtained by such totalization. By virtue of this advantage, it is possible to asymptotically improve the recognition rate.

5 Claims, 12 Drawing Sheets

$B_{HB}$
| 1 | 0 | 0 | 0 | 0 | 0 | 0 | 1 | 0 |
|---|---|---|---|---|---|---|---|---|
| 1 | 1 | 0 | 0 | 0 | 0 | 0 | 1 | 1 |
| 1 | 1 | 0 | 1 | 1 | 1 | 1 | 0 | 0 |
| 0 | 0 | 0 | 1 | 1 | 1 | 1 | 0 | 0 |
| 0 | 0 | 0 | 1 | 1 | 1 | 1 | 0 | 1 |
| 0 | 0 | 1 | 1 | 1 | 1 | 1 | 0 | 1 |
| 0 | 0 | 1 | 1 | 1 | 1 | 1 | 0 | 1 |
| 0 | 0 | 1 | 1 | 1 | 0 | 0 | 0 | 0 |
| 0 | 0 | 1 | 1 | 1 | 0 | 0 | 0 | 0 |
| 0 | 0 | 1 | 1 | 1 | 0 | 0 | 0 | 0 |
| 0 | 0 | 0 | 1 | 1 | 1 | 1 | 0 | 0 |
| 0 | 0 | 0 | 1 | 1 | 1 | 1 | 0 | 0 |
| 1 | 1 | 0 | 0 | 0 | 0 | 0 | 0 | 0 |
| 1 | 0 | 0 | 0 | 0 | 0 | 0 | 0 | 0 |
($N_2 = 5$, $N_3 = 1$)
(a)
$B_{VB}$
| 0 | 1 | 1 | 0 | 0 | 0 | 0 | 1 | 0 |
|---|---|---|---|---|---|---|---|---|
| 0 | 1 | 1 | 0 | 0 | 0 | 0 | 1 | 0 |
| 0 | 0 | 0 | 0 | 0 | 0 | 0 | 0 | 0 |
| 0 | 0 | 0 | 1 | 1 | 1 | 1 | 0 | 0 |
| 0 | 0 | 0 | 1 | 1 | 1 | 1 | 1 | 1 |
| 0 | 0 | 1 | 1 | 1 | 1 | 1 | 1 | 1 |
| 0 | 0 | 1 | 1 | 1 | 1 | 1 | 1 | 1 |
| 0 | 0 | 0 | 0 | 0 | 0 | 0 | 0 | 0 |
| 0 | 0 | 1 | 1 | 1 | 1 | 1 | 0 | 0 |
| 0 | 0 | 1 | 1 | 1 | 1 | 1 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 1 | 0 | 0 | 0 | 0 | 0 | 0 | 0 |
| 0 | 1 | 0 | 0 | 0 | 0 | 0 | 0 | 0 |
($N_2 = 5$, $N_3 = 1$)
(b)
FIG. 4D
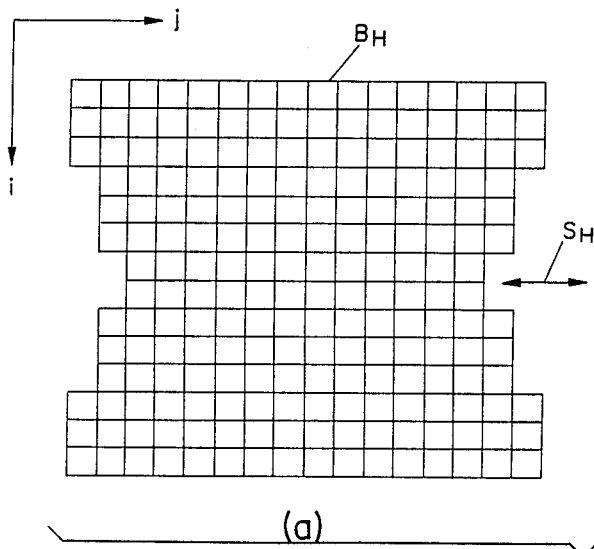
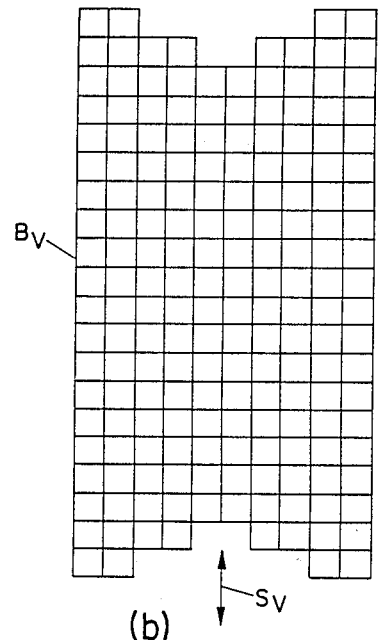
FIG. 4E
FIG. 4F

CHARACTER READING METHOD

This application is a continuation of application Ser. No. 048,668, filed on May 11, 1987, now abandoned.

BACKGROUND OF THE INVENTION

The present invention relates to a character reading method whereby unknown characters are read by steps. These characters, which are defined as objects to be read, are inputted through a photoelectric conversion element such as a television camera. The dictionary patterns to which patterns which are being read are compared for deciding which character is being read are automatically created by learning the features thereof and the thus obtained dictionary is utilized for reading.

It is generally desirable that an optical character reader be capable of recognizing characters at the highest speeds possible and of course with extreme accuracy. Several pattern recognition systems for accomplishing high speed reading of characters have been disclosed in U.S. Pat. Nos. 4,556,985, 4,628,533 and 4,630,308 and assigned to the same assignees as the present application. The systems disclosed in these patents provide character recognition at high speeds, however, similar characters are sometimes misread, therefore a more accurate character reading method is desirable.

SUMMARY OF THE INVENTION

In accordance with the invention, a character reader is provided wherein the definition of a bit-matrix is expanded. Not only is the matrix which corresponds to the conventional character component of the pattern utilized but also the matrix which corresponds to the background component of the pattern as well is employed as a feature of the character reader. Generally speaking, size expansion is required because the size of the characters generated is smaller than that of the original characters. This expansion results in a deteriorating performance when discriminating between similar characters (for instance O and Q). In order to prevent this, the complementary bit-matrices are extracted, and the background component is expanded as well as the character component. This catches the features which would normally be lost.

Moreover, as part of an automatic learning mode, cumulative bit-matrices are obtained by measuring the complementary bit-matrices with respect to the character patterns. On the basis of the thus obtained cumulative matrices, the dictionary patterns are automatically created. In obtaining the cumulative bit-matrices, a binary-coded threshold value is varied within an allowable range, and a character pattern is measured. When reading the unknown character patterns with respect to the dictionary patterns, candidate character categories are gradually reduced by performing a classifying process and also, the time required for processing is shortened.

Furthermore, the complementary bit matrices are totalized for every category on the basis of the recognized results. To correct the dictionary patterns, these patterns are computed once again in accordance with the totalized cumulative matrices. Thus, the differences between the character patterns at the time of learning and at the time of reading can quantitatively be evaluated.

BRIEF DESCRIPTION OF THE DRAWINGS

An embodiment of the present invention will be described hereinafter, with references to the accompanying drawing, in which:

FIG. 3B is an explanatory view showing critical matrices;

FIG. 4A is an explanatory view showing a horizontal run-number and a vertical run-number of a character basic bit-matrix;

FIG. 4B is an explanatory view showing a horizontal run-number and a vertical run-number of a background basic bit-matrix;

FIG. 4C is an explanatory view showing the horizontal and vertical bit-matrices of a character component;

FIG. 4D is an explanatory view showing the horizontal and vertical bit-matrices of a background component;

FIG. 4E is an explanatory view showing shift regions of the horizontal and vertical bit-matrices;

FIG. 4F is a explanatory view showing character stain bit-matrices relative to the critical matrices;

DETAILED DESCRIPTION OF THE PREFERRED EMBODIMENTS

Figure 1:
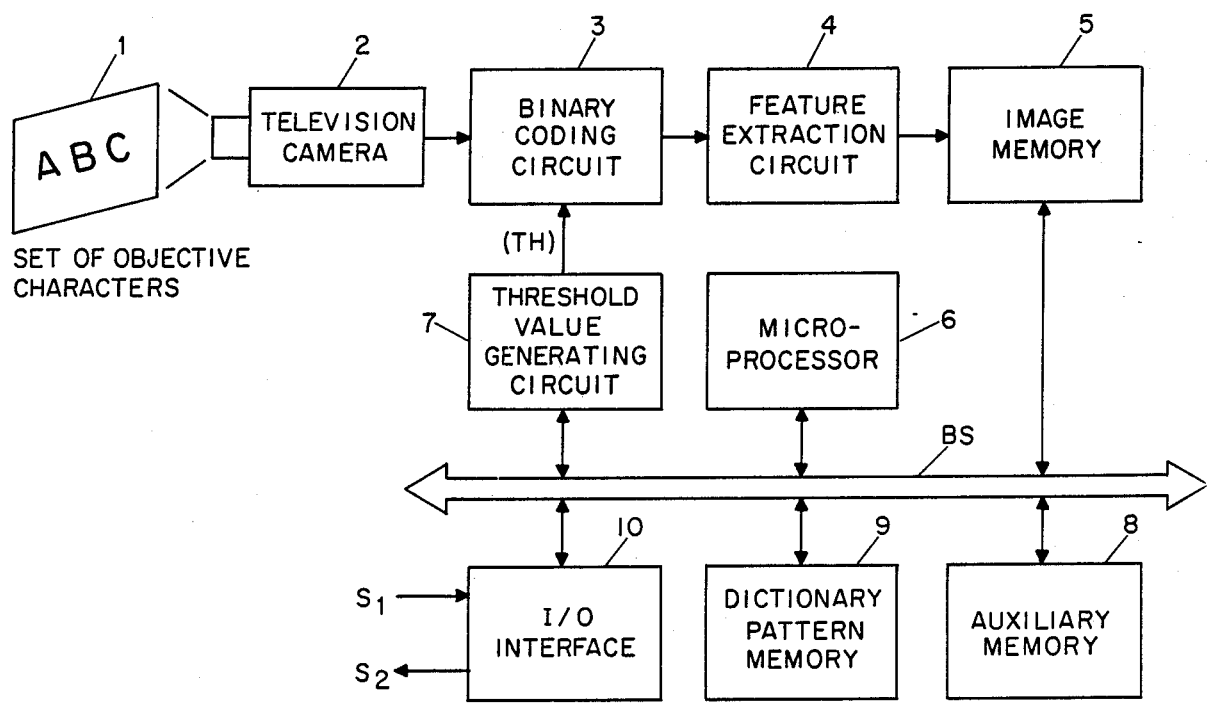
FIG. 1 is a block diagram of the embodiment of the present invention.

Illustrated in FIG. 1 is one embodiment of the present invention. In the Figure, the reference numeral 1 represents a set of object characters, 2 denotes an imaging device such as a television camera, 3 designates a variable binary-coding circuit, 4 represents a feature extraction circuit, 5 designates an image memory, 6 denotes a processing unit such as a microprocessor, 7 represents a threshold value generating circuit, 8 designates an auxiliary memory, 9 represents a dictionary pattern memory, and 10 denotes an input/output interface.

In the operation of the character reader shown in FIG. 1, a pattern representing a character is scanned by the camera 2. Time-series signals generated by the camera are successively converted into binary values with a certain threshold level and divided into pixels (picture elements) with prescribed signals by the binary-coding circuit. Segments of the binary images are extracted by the feature extraction circuit 4 and are written into the image memory 5 in a DMA mode. It is to be noted that the segment is a run of black picture elements on a horizontal scanning line. The segment information includes a segment length, a segment right end coordinate value, a main boundary length, an auxiliary boundary length and linkage information. The microprocessor 6 has access to the image memory 5 via a system bus BS. The processor can therefore perform connectivity analysis and character reading processing. The microprocessor 6 receives the images in response to a command issued from an external source through the input/output interface 10. The microprocessor then carries out the learning, reading totalizing and correcting processes. When receiving the images, the microprocessor 6 can specify a variable binary-coded threshold value (TH) to the variable binary-coding circuit 3, through the threshold value generating circuit 7. Thus, the microprocessor 6 fetches the image data while modifying the binary and coded threshold value and creates dictionary patterns. These patterns are then stored in the dictionary pattern memory 9. The auxiliary memory 8 is available as a temporary memory for multiple purposes. The patterns are scanned in response to an active level on $S_1$, and subsequently they are transmitted to the outside in response to an active level on $S_2$. The binary-coded threshold value TH is either received via the input/output interface or the value is automatically determined from an area histogram.

Figure 1A:
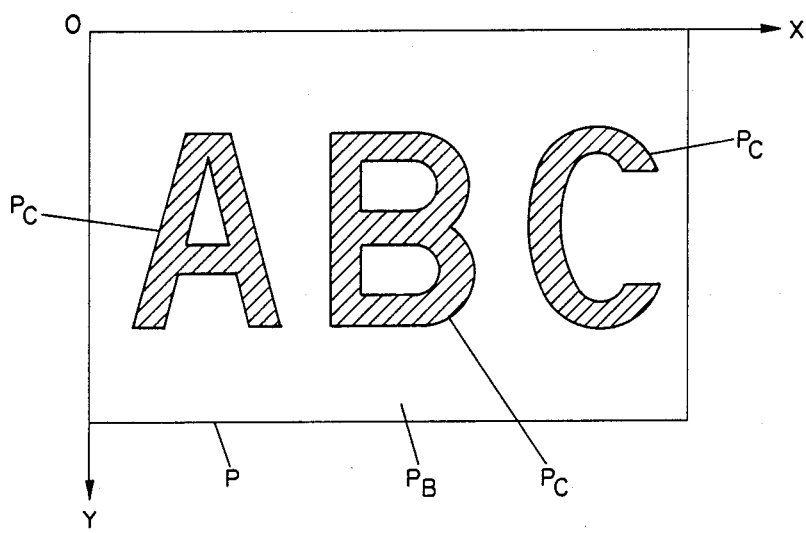
FIG. 1A is an explanatory view showing an example of images of characters.

FIG. 1(A) shows an example of binary images of characters which are scanned by the television camera 2 depicted in FIG. 1. The character patterns are within an effective picture P. The coordinates of picture elements Pc (black picture elements) of the individual patterns are expressed by the orthogonal coordinate systems X and Y. The background of the character patterns is displayed as a background picture element $P_B$ (a white picture element). The character patterns are complimentarily exhibited by the black picture elements serving as the character component and by the white picture elements serving as the background.

Figure 2:
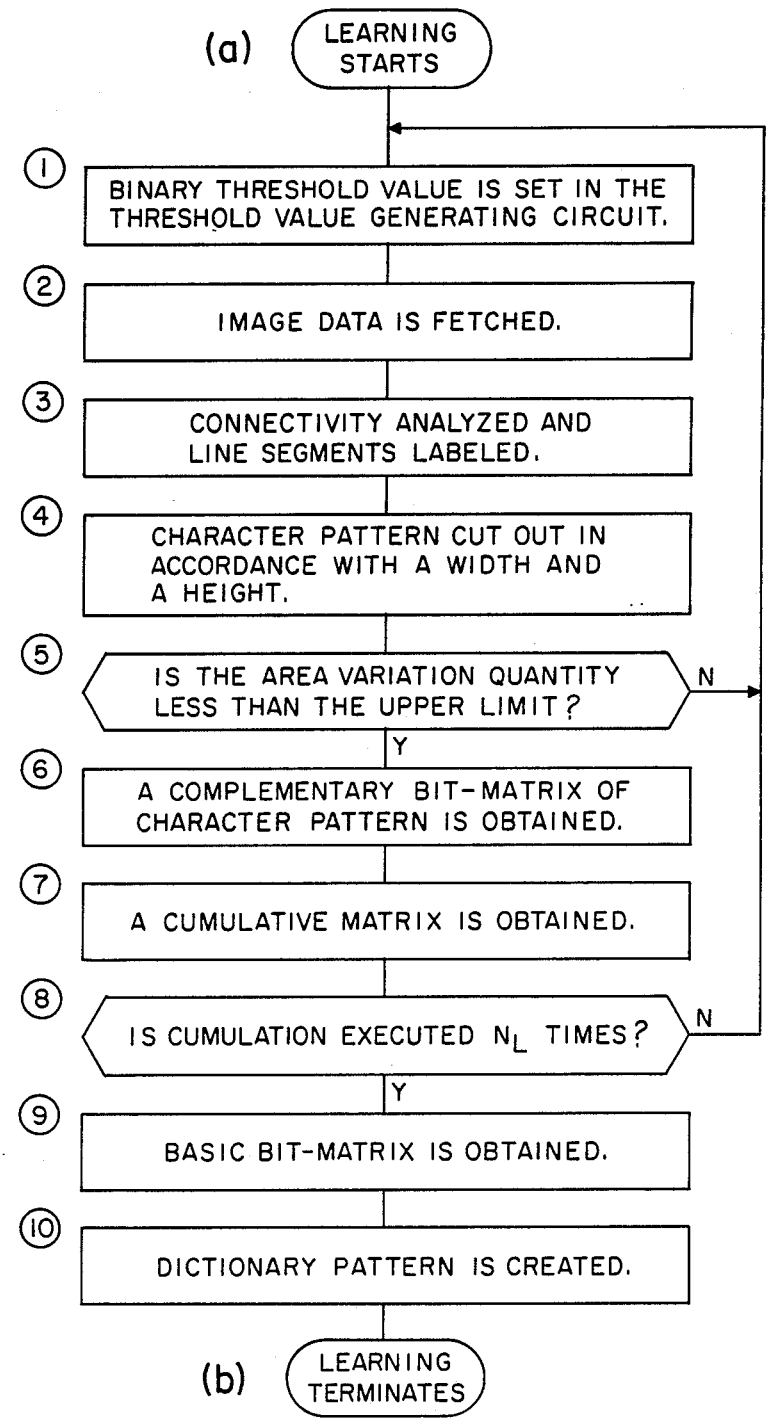
FIG. 2 is a flow chart showing the learning process of one character.

FIG. 2 shows the flow chart of a learning process wherein the microprocessor 6 creates the dictionary patterns from standard character patterns. The binary threshold value is set in the threshold value generating circuit 7 (see 1 of FIG. 2) and the image data of the character patterns which are the object to be learned are fetched (see 2 of FIG. 2). Next, the connectivity is analyzed (see 3 of FIG. 2), and the segments are labeled. The segments connected in such a step are marked with the same labels. An aggregation of segments with the same labels is simply referred to as a pattern. Obtained from each individual pattern are circumscribed frame coordinate values ($Y_T$, $Y_B$, $X_L$, $X_R$, an area ($A_C$) and a circumferential length ($L_B$) Also, the character pattern is cut out (see 4 of FIG. 2) in accordance with a width (WC) and a height ($H_C$). The area ($A_C$) of the character pattern is displayed as the total sum of the areas of patterns. If an area of the character pattern at the time of fetching an initial image of the specified character is $A_{co}$, a variation quantity $\delta_{An}$ of the area $A_{cn}$ of the n'th character pattern can be given by:

$$\delta_{An} = \left| \frac{A_{cn} - A_{co}}{A_{co}} \right| \times 100 \, (\%) \tag{1}$$

If the area variation quantity ($\delta_{An}$) is less than the upper limit ($\delta_{An}$) a complementary bit-matrix of the character pattern is obtained. If not, the binary coded threshold value is reset, and the process of image fetching is executed once again. (See 5 of FIG. 2.)

Figures 2A, 2B, 3A:
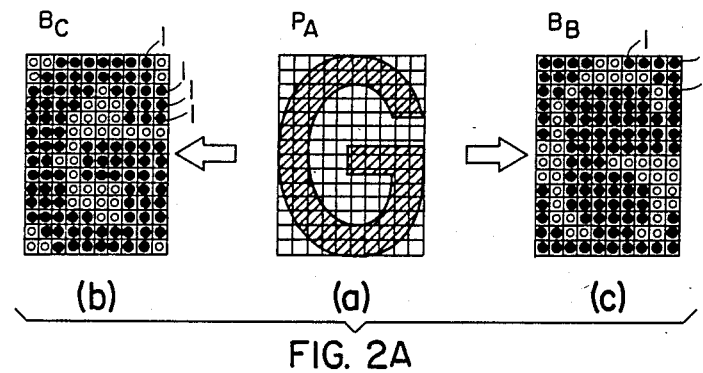
FIG. 2A is an explanatory view showing complementary bit matrices.
FIG. 2B is an explanatory view showing cumulative matrices.
FIG. 3A is an explanatory view showing basic bit-matrices.

FIG. 2A shows examples wherein a pair of complementary bit-matrices ($B_C$, $B_B$) are created. For example, the width $W_C$ of a character pattern $P_A$ is equivalent to 25 pixels, and the height $H_c$ is equivalent to 35 pixels. This figure shows a normal size of width and height where the width is 10 pixels and the height is 14 pixels. If black picture elements are present in the meshes, the value will be 1. If no black picture elements exists, the value will be 0. The thus created binary matrix is called a character bit-matrix $B_c$. FIG. 2A(b) shows the character bit-matrix, $B_c$, corresponding to FIG. 2A(a). On the other hand, if white picture elements are present in the meshes, the value will be 1. If no white picture elements exist, the value will be 0. The binary matrix created by this method is called a background bit-matrix $B_B$. FIG. 2A(c) shows the background bit-matrix, $B_B$, corresponding to FIG. 2A(a). It can be observed from the Figure that when the normal size (10 pixels × 14 pixels) is smaller than the size (25 pixels × 35 pixels) of the original character pattern, the black pixels and the white pixels are expanded in terms of appearance by executing the normalizing process in the character bit-matrix and the background bit-matrix. The character bit-matrix $B_c$ and the background bit matrix $B_B$ together are called the complementary bit matrices. The complementary bit matrices are obtained in step 6 of FIG. 2.

These complementary bit-matrices involve the binary matrices. A character cumulative matrix, $C_C$, and a background cumulative matrix, $C_B$, are obtained (see 7 of FIG. 2) by cumulating the matrix elements with respect to a character component ($B_C(i,j)$) and a background component ($B_B(i,j)$). To accomplish this, the learning process must be repeated several times. As an example, FIGS. 2B(a) and 2B(b) show the cumulative matrices when the learning process has been repeated 10 times.

Figure 3:
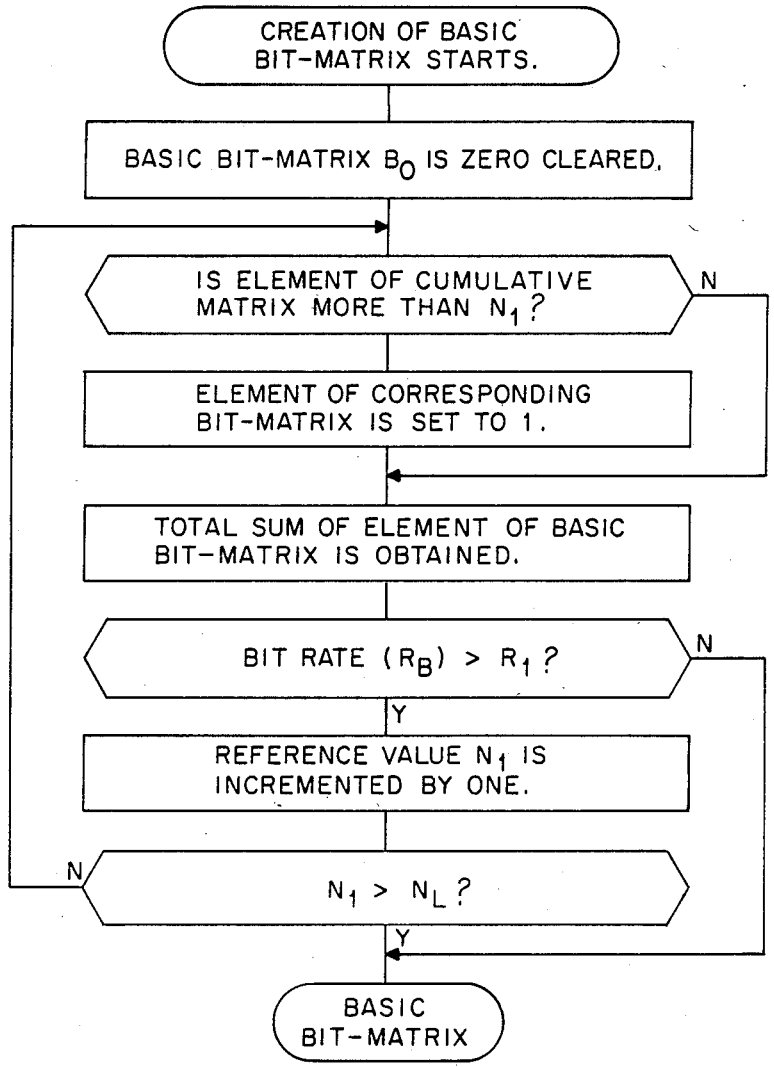
FIG. 3 is a flow chart showing the process of creating basic bit-matrices from the cumulative matrices.

A basic bit-matrix, $B_O$, is obtained from the complementary cumulative matrices of the character patterns in accordance with the processing procedures shown in FIG. 3. A bit rate, $R_B$, of a basic bit-matrix, $B_O$, is expressed as:

$$R_B = \frac{\sum_{i=1}^{H} \sum_{j=1}^{W} B_O(i,j)}{W \times H} \tag{2}$$

A reference value $N_1$, before being converted into the binary matrix, is incremented from a given value by ones so that the bit rate ($R_B$) of the basic bit-matrix is $R_1$ or less. The bit-matrix which will initially have a rate less than $R_1$ is defined as the basic bit-matrix. Hence, if the values of $R_1$ and $N_1$ are varied, even in the same cumulative matrix, the basic bit-matrix will also vary. The bit rate differs, depending on the character pattern, and the value of $R_1$ is therefore determined as the upper limit value of the bit rate with regard to all of the characters. The reference value $N_1$ is used to simulate the fluctuations in the linear-width of the character. These fluctuations are caused by variations in the binary coded threshold value at the time of learning.

FIG. 3A(a) shows an example of a basic bit-matrix, $B_{oc}$, which is obtained from the character cumulative matrix, $C_c$, depicted in FIG. 2B(a), with the conditions of $N_1=5$ and $R_1=8$. FIG. 3A(b) shows an example of a basic bit-matrix, $B_{OB}$, which is obtained from the background cumulative matrix, $C_B$, depicted in FIG. 2B(b), with the conditions of $N_1=7$ and $R_1=0.8$. The bit-matrix obtained when $N_1=1$ and $R_1=1$ is a basic bit-matrix having a maximum bit rate. This is referred to as a critical bit-matrix. Critical bit-matrices, $B_{CC}$ and $B_{CB}$, are shown in FIGS. 3B(a) and 3B(b).

Figure 4:
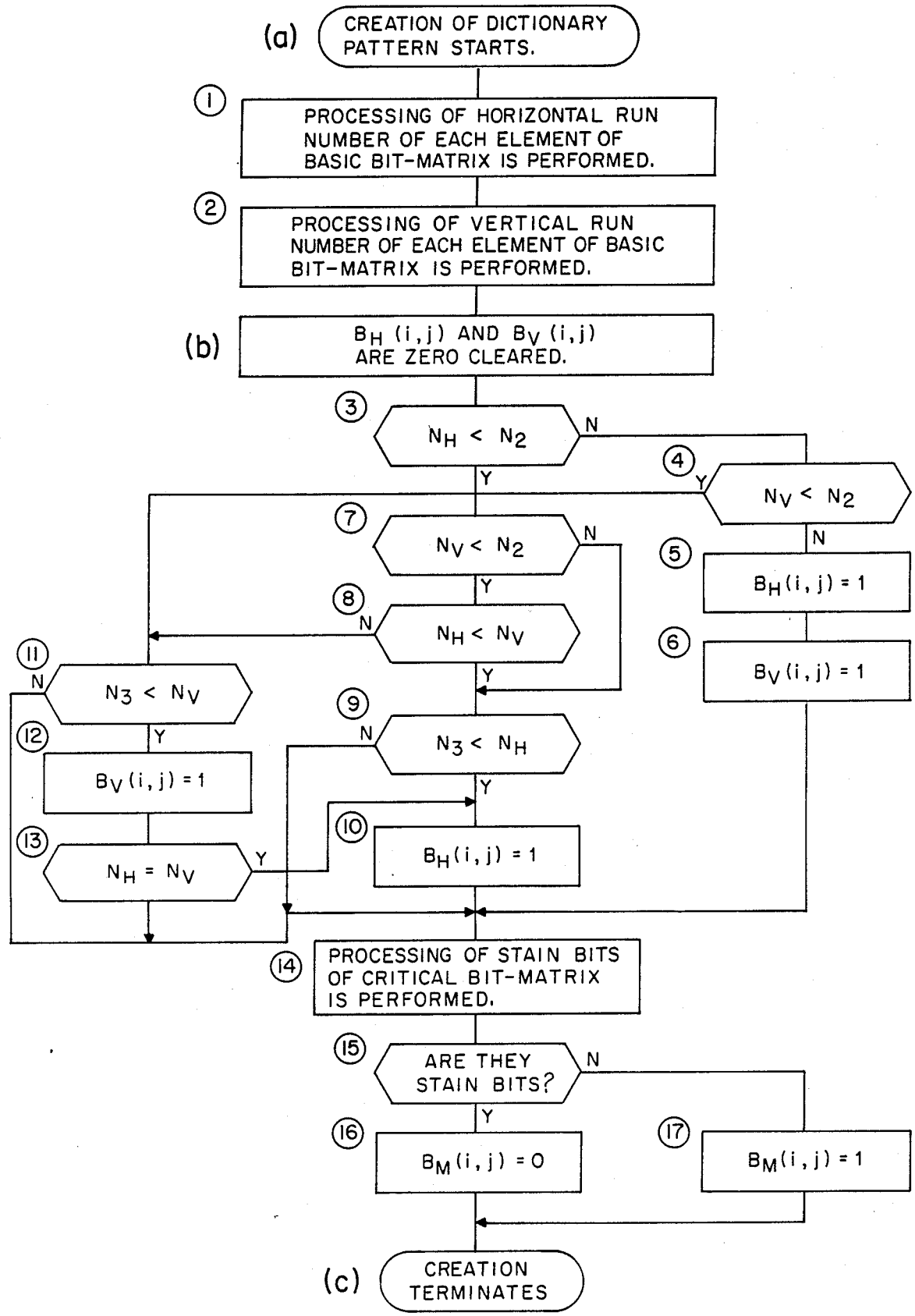
FIG. 4 is a flow chart showing the process of creating dictionary patterns.

FIG. 4 shows the processing procedure in which the dictionary patterns are obtained from the basic bit-matrices ($B_{OC}$, $B_{OB}$) and from the critical bit-matrices ($B_{CC}$, $B_{CB}$).

Figures 4A, 4B, 4C:
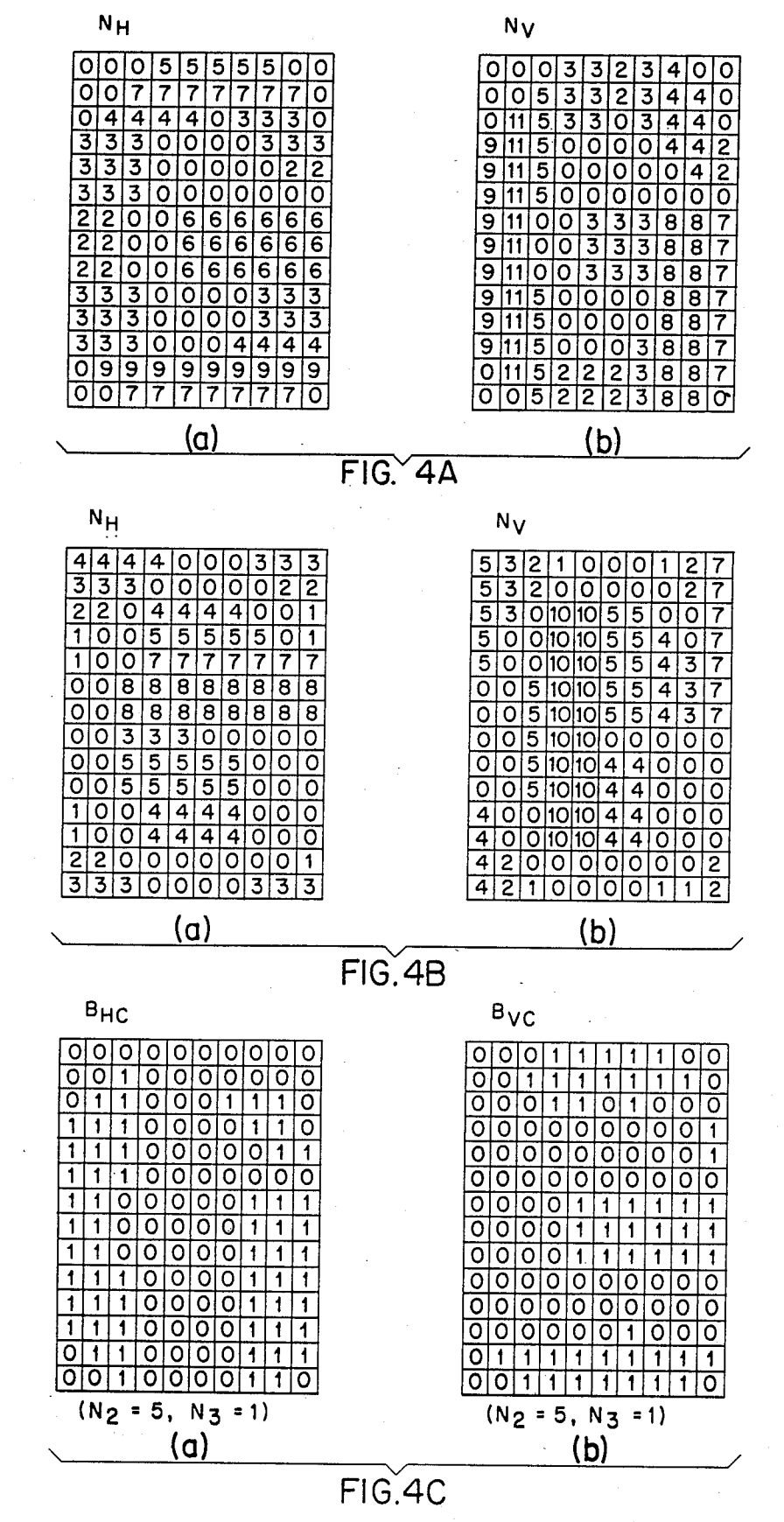

First, a horizontal run-number ($N_H$) of each matrix element is obtained from the basic bit-matrices. The horizontal run-number $N_H$ is the number of elements, having a value of 1, which can be found in a row of the emphasized matrix elements ($B_{OC}(i,j)$ or $B_{OB}(i,j)$). If the number of elements is 0, no range exists and the horizontal run-number $N_H$ is also 0. Similarly, a vertical run-number ($N_V$) is the number of elements, having a value of 1, which can be found in a column. FIGS. 4A(a) and 4A(b) show the matrices of the horizontal run-number, $N_H$, and of the vertical run-number, $N_V$, of the character basic bit-matrix, $B_{OC}$. The matrices of the horizontal run-number and of the vertical run-number of the background basic bit-matrix, $B_{OB}$, are shown in FIGS. 4B(a) and 4B(b).

The above described process is performed in steps 1 and 2 of FIG. 4. When $N_H$ and $N_V$ of the emphasized basic bit-matrix are equal to or greater than $N_2$, the emphasized matrix elements of the horizontal/vertical bit-matrices become 1 (see 3, 4, 5 and 6 of FIG. 4). When $N_H$ is less than $N_2$, $N_V$ is equal to or greater than $N_2$, and $N_H$ is greater than $N_3$, then $B_H$ is equal to 1 (see 3, 7, 9 and 10 of FIG. 4). If $N_H<N_2$, $N_V<N_2$, $N_H \geq N_V$ and $N_V \geq N_3$ then $B_V=1$ (see 3, 7, 8, 11 and 12 of FIG. 4). If $N_H \geq N_2$, $N_V<N_2$, and $N_3<N_V$ then $B_V=1$ (see 3, 4, 11 and 12 of FIG. 4). When $N_H<N_2$, $N_V<N_2$, $N_H=N_V$, $N_3<N_V$, then $B_H(i,j)=B_V(i,j)=1$ (see 3, 7, 8, 11, 12, 13 and 10 of FIG. 4). In other cases, the individual matrix elements of $B_H$ and $B_V$ remain zero-cleared.

The reference values $N_2$ and $N_3$ which determine both the horizontal bit-matrix $B_H$ and the vertical bit-matrix $B_V$ are determined from the linear width of the character patterns. $N_2$ is the value used for examining whether or not it exceeds the linear width. $N_3$ is the value used for eliminating noise or other interference. FIGS. 4C(a) and 4C(b) show examples of horizontal/vertical bit-matrices, $B_{HC}$ and $B_{VC}$, with respect to the character basic bit-matrix. For this example $N_2=5$ and $N_3=1$. Similarly, FIGS. 4D(a) and 4D(b) show horizontal/vertical bit-matrices $B_{HB}$ and $B_{VB}$ with respect to the background basic bit-matrix.

After obtaining the horizontal/vertical bit-matrices $B_H$, $B_V$, a mask bit-matrix $B_M$ is obtained. To obtain the mask bit-matrix a stain bit must be defined. Stain bit-matrices, $B_{DCC}$ and $B_{DBC}$, are calculated with respect to the critical bit-matrices, $B_{CC}$ and $B_{CB}$. In this case, to obtain the stain bit-matrices, shifting operations are executed in both, a horizontal direction ($S_H$), and in a vertical direction ($S_V$). Examples of this shift are shown in FIGS. 4E(a) and 4E(b). A horizontal shifting quantity $S_H$ implies that the (i)'th row of the bit-matrix is shifted up to the $S_H(i)$, and a vertical shifting quantity $S_V$ implies that the (j)'th column of the bit-matrix is shifted up to $S_V(j)$. The stain bit-matrices $B_{DCC}$ and $B_{DBC}$ with respect to the critical bit-matrices are defined in the following equations.

$$B_{DCC}(i,j) = \left( \overline{\sum_{j'=-S_H(i)}^{S_H(i)} B_{HC}(i, j+j') + \sum_{i'=-S_V(j)}^{S_V(j)} B_{VC}(i+i', j)} \right) \times B_{CC}(i,j); \text{ and} \quad (3)$$

$$B_{DBC}(i,j) = \left( \overline{\sum_{j'=-S_H(i)}^{S_H(i)} B_{HB}(i, j+j') + \sum_{i'=-S_V(j)}^{S_V(j)} B_{VB}(i+i', j)} \right) \times B_{CB}(i,j). \quad (4)$$

Figure 4G:
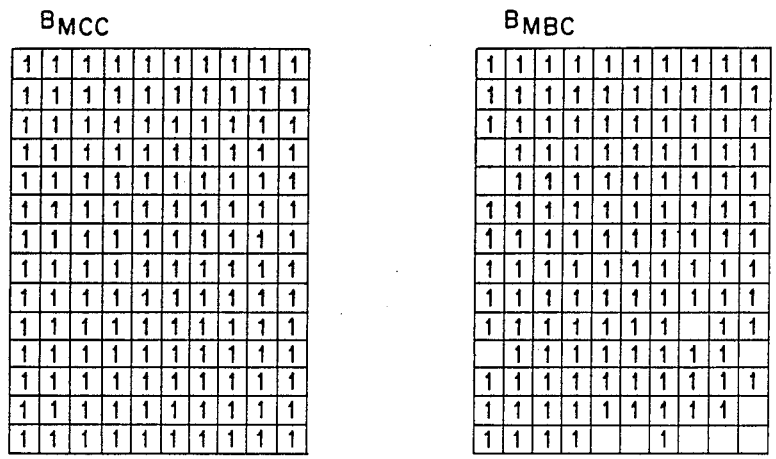
FIG. 4G is an explanatory view showing background stain bit-matrices relative to the critical matrices.

FIG. 4F(a) shows an example of the stain bit-matrix $B_{DCC}$ relative to the character critical bit-matrix shown in FIG. 3B(a). FIG. 4F(b) shows an example of the stain bit-matrix $B_{DBC}$ relative to the background critical bit-matrix shown in FIG. 3B(b). Mask bit-matrices, $B_{MCC}$ and $B_{MBC}$, are obtained by inverting the individual elements of these stain bit-matrices. Such examples are shown in FIGS. 4G(a) and 4G(b).

The above described process is performed in steps 14, 15, 16 and 17 of FIG. 4 thereby completing the creation of a dictionary pattern.

Figure 5:
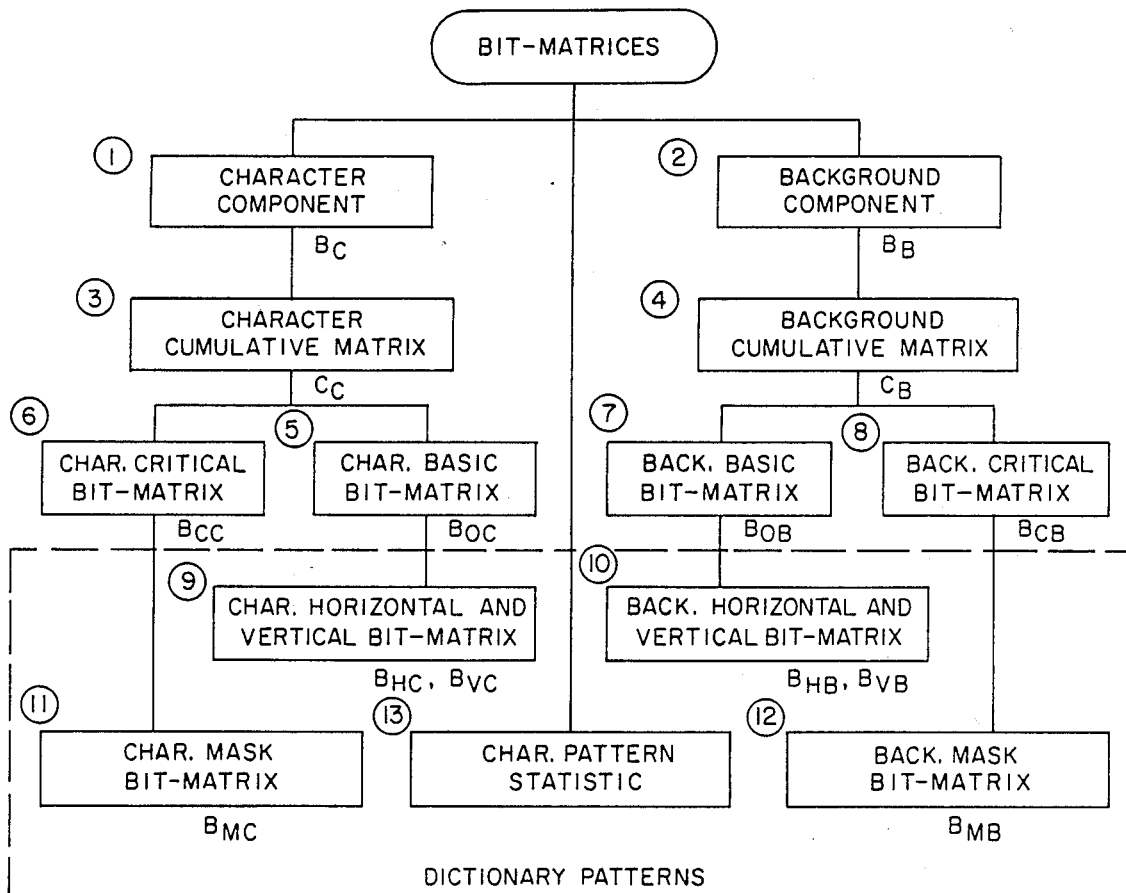
FIG. 5 is an explanatory view illustrating the flow of the development of matrices during the dictionary creating processes.

FIG. 5 shows the flow of the development of matrices during the dictionary creating process.

To start with, a bit-matrix of the character to be learned is measured $N_L$ times and divided into a character component $B_C$ and a background component $B_B$ (see 1 and 2 of FIG. 5). After the cumulation has been executed $N_L$-times, a character cumulative matrix $C_C$ and a background cumulative matrix $C_B$ are obtained (see 3 and 4 of FIG. 5). From the respective cumulative matrices are obtained basic bit-matrices, $B_{OC}$ and $B_{OB}$, and critical bit-matrices, $B_{CC}$ and $B_{CB}$ (see 5, 6, 7 and 8 of FIG. 5). The horizontal run-number and the vertical run-number are obtained from the basic bit-matrices ($B_{CC}$, $B_{OB}$). From there, horizontal bit-matrices ($B_{HC}$, $B_{HB}$) and vertical bit-matrices ($B_{VC}$, $B_{VB}$) are obtained (see 9 and 10 of FIG. 5). Furthermore, from critical bit-matrices ($B_{CC}$, $B_{CB}$), mask bit-matrices ($B_{MC}$, $B_{MB}$) are obtained (see 11 and 12 of FIG. 5). A character pattern statistic is obtained from the character patterns which have been learned $N_L$-times (see 13 of FIG. 5). The character pattern statistic includes a mean width $\overline{W}c$, a mean height $\overline{H}c$, a mean area $\overline{A}c$, a normalization ratio $\overline{\lambda}_W \times \overline{\lambda}_H$, an area weight mean threshold value $t_A$ and a threshold value median $t_M$.

The character pattern statistic can be given by the following equations:

$$\overline{W_C} = \frac{1}{N_L} \sum_{i=1}^{N_L} W_C(i) \tag{5}$$

$$\overline{H_C} = \frac{1}{N_L} \sum_{i=1}^{N_L} H_C(i) \tag{6}$$

$$\overline{A_C} = \frac{1}{N_L} \sum_{i=1}^{N_L} A_C(i) \tag{7}$$

$$\lambda_W = \frac{\overline{W_c}}{W_N} \tag{8}$$

$$\lambda_H = \frac{\overline{H_c}}{H_N} \tag{9}$$

$$t_a = \sum_{i=1}^{N_L} A_c(i) \odot t_c(i) / \sum_{i=1}^{N_L} A_c(i) \tag{10}$$

In the above equations, the normalized size is given as $W_N \times H_N$. Also, $t_c(i)$ is the binary coded threshold value. Dictionary pattern data includes the horizontal, vertical and mask bit-matrices as well as the character pattern statistic. The parameters of the statistic have an initial binary coded threshold equal to $t_0$ and a critical threshold value equal to $t_1$. $t_2$ is obtained when the area variation quantity is $\delta_{AO}$, and is used as a binary coding control parameter during the automatic reading.

The dictionary patterns are created with respect to the character categories which are recognized in the above described process. The resultant patterns are stored in the dictionary pattern memory 9 depicted in FIG. 1.

Figure 6:
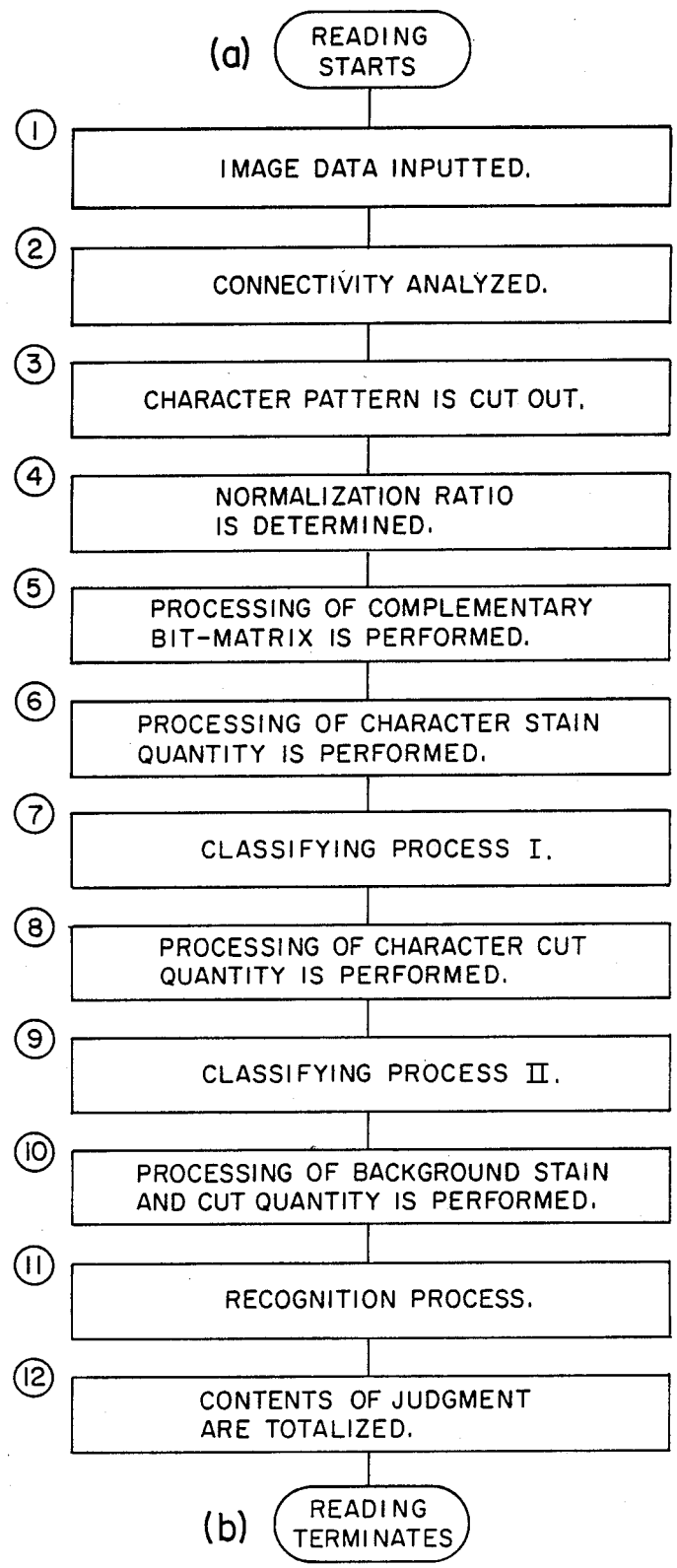
FIG. 6 is a flow chart showing the reading process.

The microprocessor 6 executes a reading process in response to an active level on $S_1$. FIG. 6 shows a flow chart of the reading process.

Data on the unknown character images is received (see 1 of FIG. 6) and the segment information is written into the image memory 5 where conductivity analysis is performed (see 2 of FIG. 6). Subsequently, the pattern information is acquired, and the character pattern is cut out in accordance with the width $\overline{W_C}$ and the height $\overline{H_C}$ of the character pattern (see 3 of FIG. 6). These processes are performed for every character pattern. Next, the normalization ratio is determined for the purpose of performing the normalizing process of the character pattern (see 4 of FIG. 6).

Figure 6A:
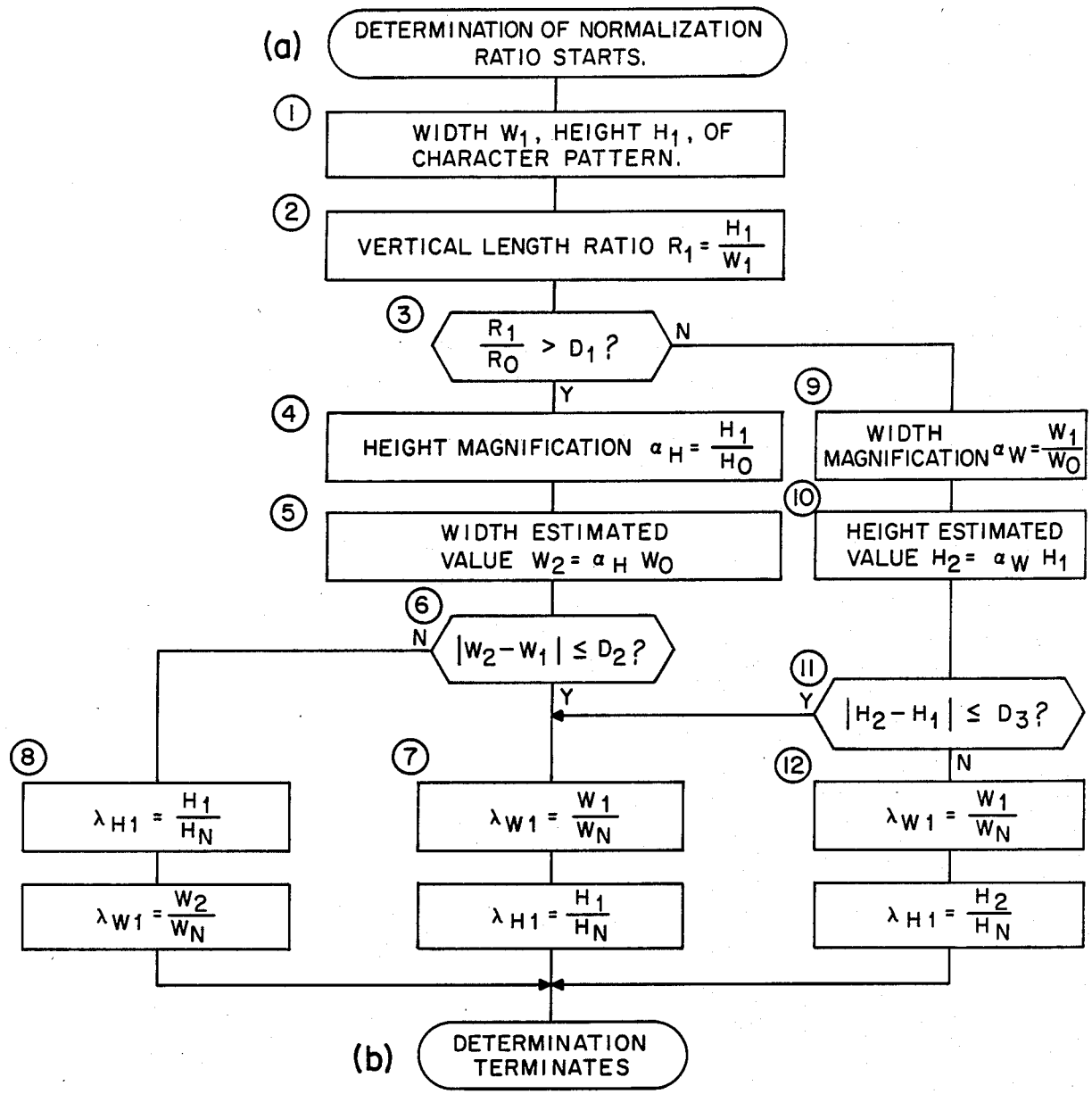
FIG. 6A is a flow chart showing the process of determining a normalization ratio.

FIG. 6A shows a flow chart of a process in which the normalization ratio is determined. At first, a width, $W_1$ pixel, and a height, $H_1$ pixel, of the character pattern is obtained (see 1 of FIG. 6A). Then a vertical length ratio $R_1$ is calculated from the following equation (see 2 of FIG. 6A).

$$R_1 = \frac{H_1}{W_1} \tag{11}$$

A vertical length ratio with a reference value Ro is given by Ho/Wo with respect to the reference values Wo for width and Ho for height.

In a great majority of cases, the character pattern is vertically lengthy and hence the vertical length ratio reference value Ro falls within a range of 1.0 to 2.0. The next step, $(R_1/R_0) > D_1$, determines whether the unknown character is vertically lengthy or horizontally lengthy in regard to a reference character pattern frame (Wo × Ho). A lower limit value of the vertical length ratio usually ranges from 0.8 to 1.2. If the unknown character is vertically lengthy, a height magnification of $\alpha_H = (H_1/H_0)$ is obtained in the next step (see 4 of FIG. 6A). Thereafter, the width is estimated (see 5 of FIG. 6A). If $[|W_2 - W_1| \leq D_2]$ is established in relation to the estimated width value of $W_2 = \alpha_H \cdot W_0$ (see 6 of FIG. 6A), the normalization ratios, $\lambda W_1$ and $\lambda H_1$, are determined from the width, $W_1$, and the height, $H_1$, of the unknown character pattern (See 7 of FIG. 6A). If the width estimation upper limit value, $D_2$, is exceeded, the normalization ratios are determined from both an estimated width, $W_2$, and from the height, $H_1$, (see 8 of FIG. 6A). Similarly, when the unknown character pattern is horizontally long, a width magnification of $\alpha_W = (W_1/W_0)$ is obtained from the width reference value Wo, (see 9 of FIG. 6A), and the height is then estimated (see 10 of FIG. 6A). If the estimated height value given by $H_2 = \alpha_W H_1$ satisfies $[|H_2 - H_1| \leq D_3]$ (see 11 of FIG. 6A), the normalization ratios are determined from $W_1$ and $H_1$. If the height estimation upper limit value, $D_3$, is exceeded, the normalization ratios are determined from $W_1$ and $H_2$ (see 12 of FIG. 6A).

After determining the normalization ratios ($\lambda W_1$, $\lambda H_1$, the complementary bit-matrices, $B_C$ and $B_B$, are obtained by adjusting the upper left side of the circumscribed frame of the unknown character pattern to the upper left side of the mesh which has a normalized size of $W_N \times H_N$ (see 5 of FIG. 6). A character stain bit-matrix $B_{DC}(i, j)$ is given by formula (12) and a character stain quantity $D_{MC}$ is given by formula (13) (see 6 of FIG. 6).

$$B_{DC}(i,j) = \left[ \left( \sum_{j'=-S_H(i)}^{S_H(i)} B_{HC}(i, j + j') \right) + \left\{ \sum_{i'=-S_V(j)}^{S_V(j)} B_{VC}(i + i', j) \right\} \right] \times \tag{12}$$

$$B_C(i,j) \times B_{MC}(i,j)$$

$$D_{MC} = \sum_{i=1}^{H_N} \sum_{j=1}^{W_N} B_{DC}(i,j) \tag{13}$$

The character stain quantity, $D_{MC}$, is obtained with respect to all of the character categories and classifying process I is executed on the basis of these results (see 7 of FIG. 6).

Figure 6B:
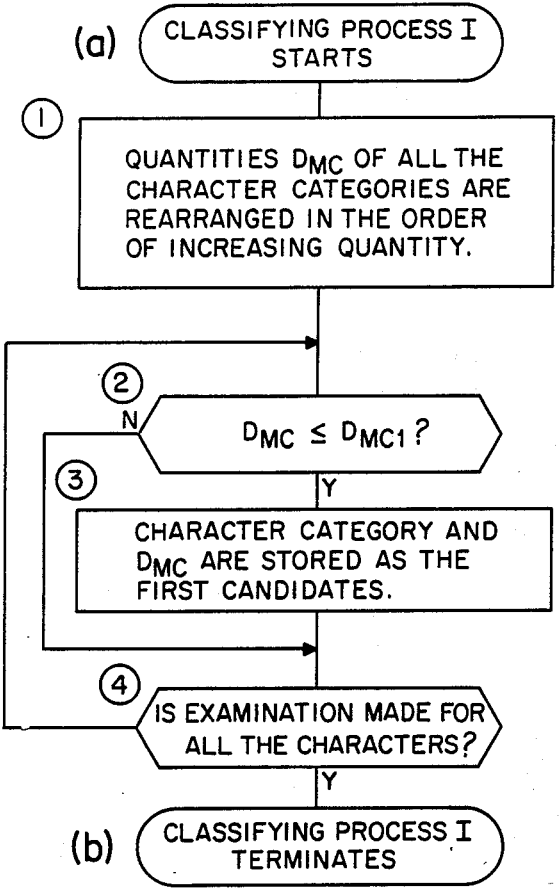
FIG. 6B is a flow chart showing classifying process I.

FIG. 6B shows a flow chart of classifying process I. First the character stain quantities, $D_{MC}$, of all of the character categories are arranged in the order of increasing quantities. The next step is to determine sequentially, starting from the smaller quantity, whether or not they are lesser than or equal to the set value $D_{MC1}$ (see 2 of FIG. 6B). When such quantities are lesser than or equal to the set value, they are stored as the first candidate characters (see 3 of FIG. 6B). If the upper limit set value, $D_{MCI}$, is decreased, the number of candidate characters will be reduced and therefore the processing time will be shortened. The above described classifying process I is performed for every character (see 4 of FIG. 6B).

After classifying process I is completed, the character cut quantity is computed as below (see 8 of FIG. 6).

A vertical cut quantity bit-matrix, $B_{CVC}$, of the character is obtained by the following equation:

$$B_{CVC}(i,j) = \left\{ \sum_{i'=-S_V(j)}^{S_V(j)} B_C(i+i',j) \right\} \cdot B_{VC}(i,j); \text{ and} \quad (14)$$

A character horizontal cut quantity bit-matrix, $B_{CHC}$, of the character is likewise obtained by the following equation:

$$B_{CHC}(i,j) = \left\{ \sum_{j'=-S_H(i)}^{S_H(i)} B_C(i,j+j') \right\} \cdot B_{HC}(i,j) \quad (15)$$

Furthermore, a cut bit-matrix $B_{KC}$ of the character is obtained by the following equation:

$$B_{KC}(i,j) = B_{CVC}(i,j) + B_{CHC}(i,j) \quad (16)$$

A character cut quantity $D_{CC}$ is obtained by the following equation:

$$D_{CC} = \sum_{i=1}^{H_N} \sum_{j=1}^{W_N} B_{KC}(i,j) \quad (17)$$

This character cut quantity $D_{CC}$ is obtained with respect to all of the character categories and classifying process II is executed on the basis of these results (see 9 of FIG. 6).

Figure 6C:
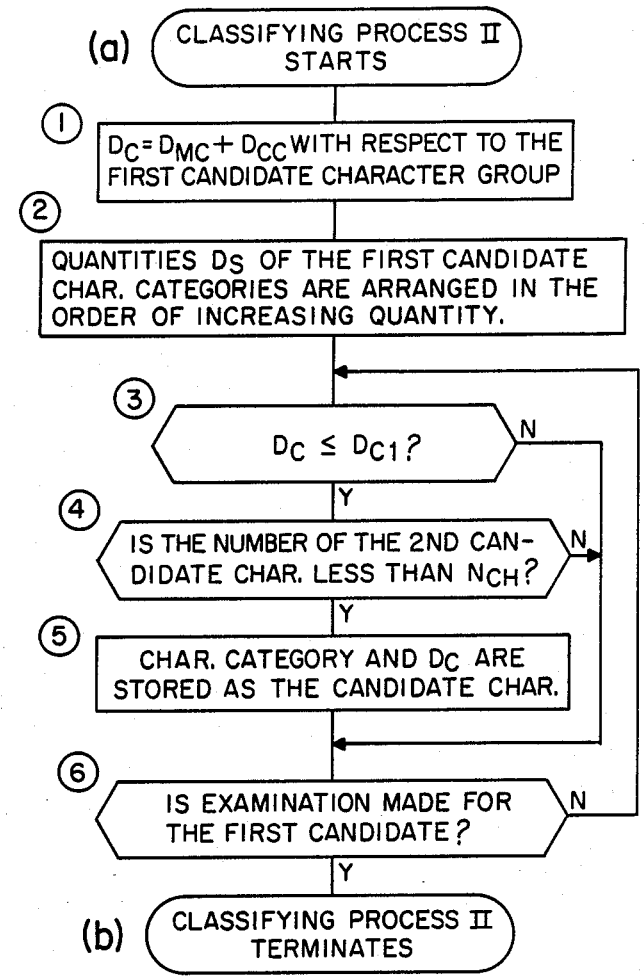
FIG. 6C is a flow chart showing classifying process II.

FIG. 6C shows a flow chart of classifying process II. In process II, dissimilar quantities, indicated by $D_C = D_{MC} + D_{CC}$, of character are arranged in the order of increasing quantities (see 1 and 2 of FIG. 6C). When each of the dissimilar quantities, $D_C$, is equal to or less than $D_{C1}$ (see 3 of FIG. 6C), and is also equal to or less than $N_{CH1}$ (see 4 of FIG. 6C), the character category and the dissimilarity quantity are, with these serving as the second candidate characters, stored in the memory (see 5 of FIG. 6C). The above described process is executed on all of the first candidate characters (see 6 of FIG. 6C).

So far, the stain quantity and the cut quantity of the character component have been described. The same processing is required to obtain the background component (see 10 of FIG. 6).

Stain bit-matrix, (12')

$$B_{DB}(i,j) = \left[ \left\{ \sum_{j'=-S_H(i)}^{S_H(i)} B_{HB}(i,j+j') \right\} + \left\{ \sum_{i'=-S_V(j)}^{S_V(j)} B_{VB}(i+i',j) \right\} \right]; \text{ and}$$

Stain quantity, $D_{MB} = \sum_{i=1}^{H_N} \sum_{j=1}^{W_N} B_{DB}(i,j) \quad (13')$ Vertical cut bit-matrix, (14')

$$B_{CVB}(i,j) = \left\{ \sum_{i'=-S_V(j)}^{S_V(j)} B_B(i+i',j) \right\} \cdot B_{VB}(i,j)$$

Horizontal bit-matrix, (15')

$$B_{CHB}(i,j) = \left\{ \sum_{j'=-S_H(i)}^{S_H(i)} B_B(i,j+j') \right\} \cdot B_{HB}(i,j)$$

Cut bit-matrix, (16')

$$B_{KB}(i,j) = B_{CVB}(i,j) + B_{CHB}(i,j)$$

Cut quantity, (17')

$$D_{CB} = \sum_{i=1}^{H_N} \sum_{j=1}^{W_N} B_{KB}(i,j)$$

Figure 6D:
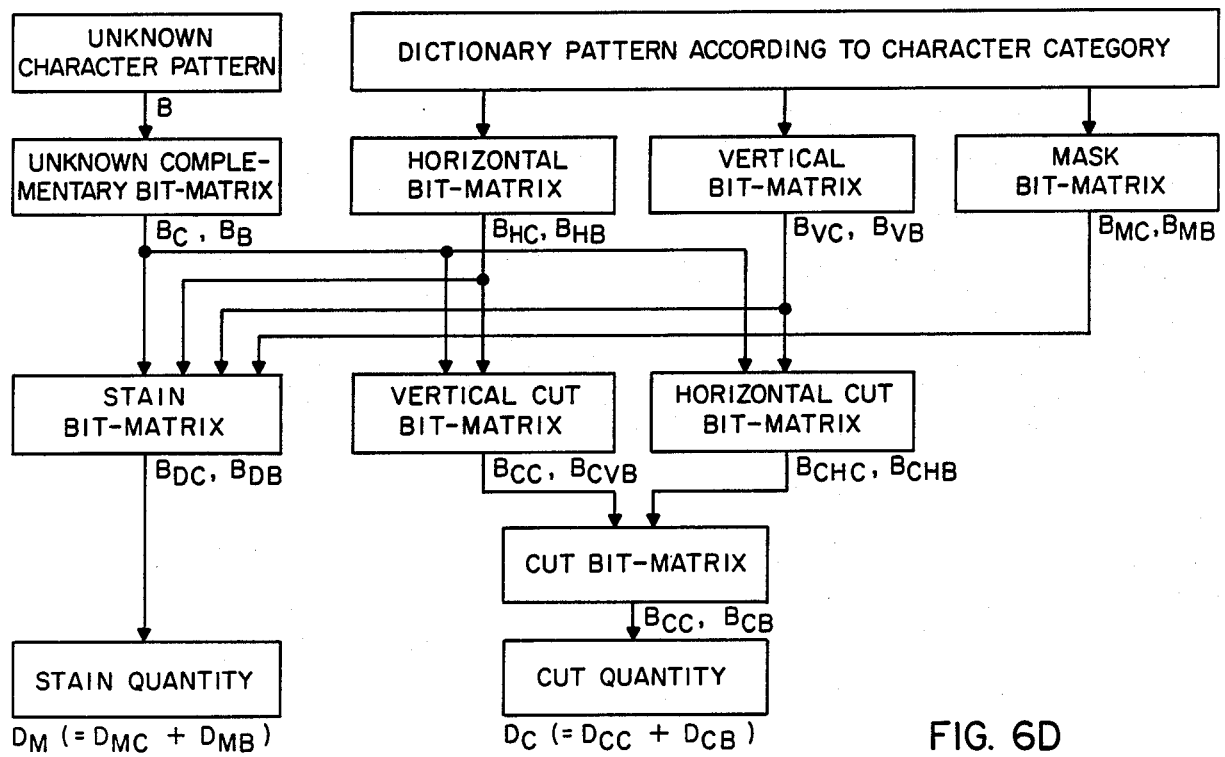
FIG. 6D is an explanatory view illustrating an evaluation index.

(The equation numbers 12–17 are marked with (') such as (14') because these equations correspond to equations 12–17 described earlier). FIG. 6D shows a flow chart in which the matrices are calculated. The resultant stain quantity and cut quantity are used as evaluation indices when reading the characters.

Figures 6E, 6F:
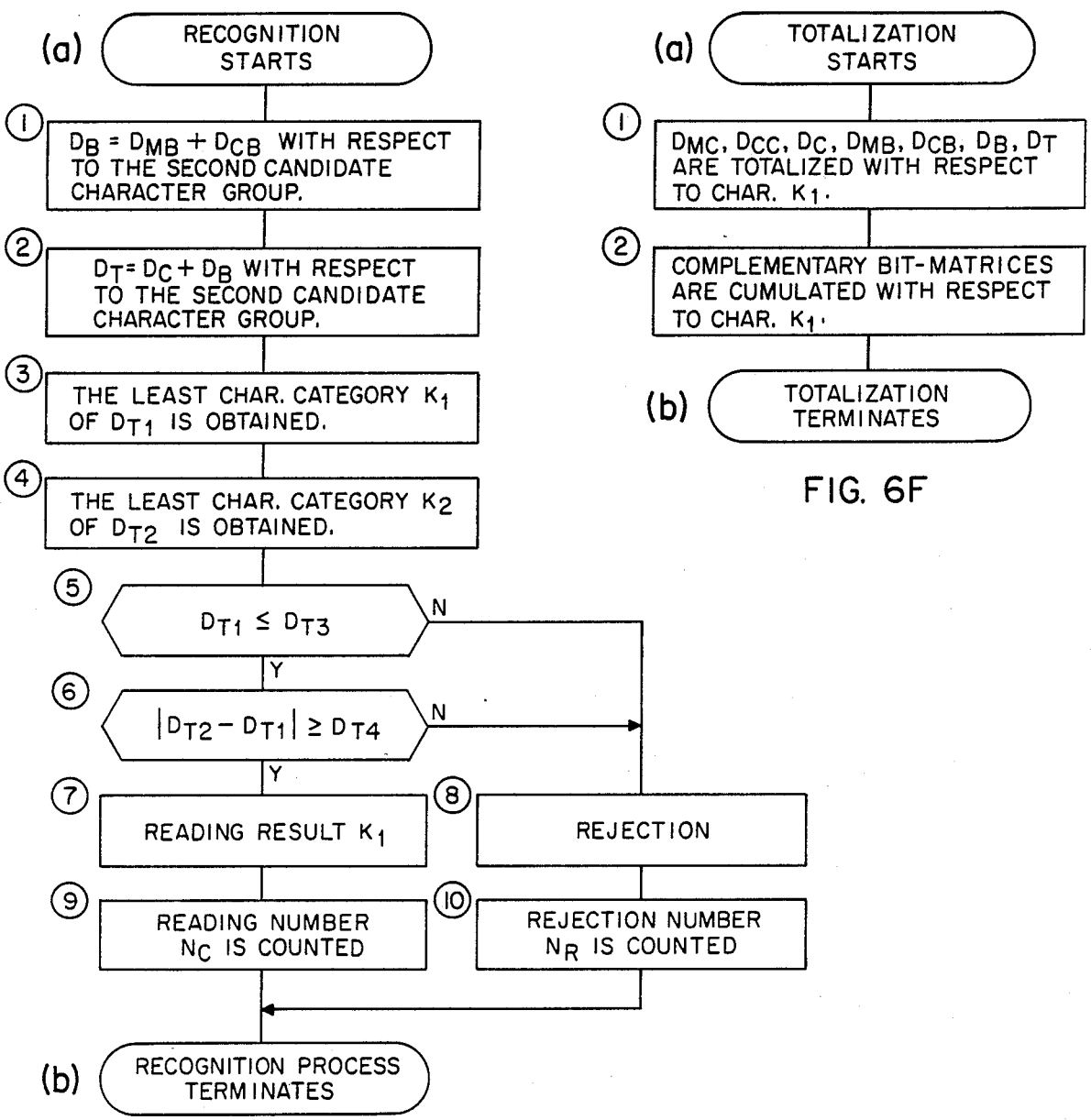
FIG. 6E is a flow chart showing a recognition process.
FIG. 6F is a flow chart showing a totalization process.

The next phase of the reading process is the recognition process (see 11 of FIG. 6). FIG. 6E shows a flow chart of this process.

With respect to the previously obtained second candidate characters, a background dissimilarity quantity $D_B = (D_{MB} + D_{CB})$ and a total dissimilarity quantity $D_T = (D_C + D_B)$ are obtained (see 1 and 2 of FIG. 6E). Subsequently a character category $K_1$ is established such that the total dissimilarity quantity $D_T$ is decreased to its smallest value. This smallest value is $D_{T1}$ (see 3 of FIG. 6E). A character category $K_2$ is obtained with the total dissimilarity quantity $D_T$ decreased to a minimum ($D_{T2}$) (see 4 of FIG. 6E). As a result, when satisfying both $D_{T1} \leq D_{T3}$ and $|D_{T2} - D_{T1}| \geq D_{T4}$ (see 5 and 6 of FIG. 6E), the reading result of the unknown character is $K_1$ (see 7 of FIG. 6E). When not satisfying the above equations, a rejection exists (see 8 of FIG. 6E). A reading number $N_C$ and a rejection number $N_R$ are counted in connection with the character category $K_1$. The above mentioned recognition process is executed on all of the unknown characters and the results are transmitted on output line $S_2$ (see FIG. 1).

Finally the contents of judgment are totalized (see 12 of FIG. 6). FIG. 6F shows a flow chart of this process.

To be specific, $D_{MC}$, $D_{CC}$, $D_C$, $D_{MB}$, $D_{CB}$, $D_B$ and $D_T$ are totalized with respect to the character $K_1$ (see 1 of FIG. 6F). Cumulation of the complementary bit-matrices is executed on the character $K_1$ (see 2 of FIG. 6F). The totalized data is used for modifying the dictionary patterns. Therefore it is possible to acquire still more reliable standard patterns by executing both the processing operation of the basic bit-matrix, which is shown in FIG. 2, and the creation of the dictionary patterns through the cumulative matrices of the totalized data. The dictionary patterns are modified in this way. Also, it is possible to determine whether or not the dictionary patterns are adequately modified by analyzing the rejection rate.

I claim:
1. In a device which comprises:
    means for scanning an unknown character pattern and providing a video signal corresponding to an image of the unknown pattern, binary coding means for dividing the image into an array of pixels and converting the video signals into binary values using a threshold level, feature extracting means for converting the binary values corresponding to the pixels into segments corresponding to the im- age, memory means for storing the segments corresponding to the image, and operating means for performing reprogramming operations on the data stored in the memory means;

an improved method comprising the steps of:

obtaining repeatedly a bit matrix of an unknown character in a background pattern and decomposing it into a character component and a background component;

modifying a binary coded level in sequential order with respect to a dictionary character pattern;

statistically processing separately said character component and said background component of said individual bit matrices for obtaining horizontal, vertical and mask bit matrices for each category of characters;

storing said individual bit-matrices as dictionary patterns in a given memory;

obtaining evaluation indices on the basis of said individual bit-matrices of said character component and said background component, and of said horizontal, vertical and mask bit-matrices according to components of said dictionary patterns;

and recognizing said unknown character pattern from the results of processing the evaluation indices.

2. An improvement in the improvement of claim 1, further comprising means for totalizing data on said unknown character patterns according to a category of characters and means for modifying an already-learned dictionary pattern by performing processing on a new dictionary pattern on the basis of the thus totalized results.

3. An improvement in the improvement of claim 2, wherein said evaluation indices comprise:

$$\text{Stain quantity} \quad D_M = \sum_{i=1}^{H_N} \sum_{j=1}^{W_N} B_D(i,j)$$

$$\text{Cut quantity} \quad D_C = \sum_{i=1}^{H_N} \sum_{j=1}^{W_N} B_K(i,j)$$

where:
$B_D$ is a stain bit-matrix, and
$B_K$ is a cut bit-matrix.

4. An improvement in the improvement of claim 3, wherein there is included means for rejecting during said recognizing if equations $D_{T1} \leq D_{T3}$ and $|D_{T2} - D_{T1}| \geq D_{T4}$ are not satisfied, where $D_T$ is a total dissimilarity quantity.

5. An improvement in the improvement of claim 4 wherein said means for totalizing data comprises means for totalizing $D_{MC}$, $D_{CC}$, $D_C$, $D_{MB}$, $D_{CB}$, $D_B$ and $D_T$ with respect to character $K_1$, where:

$D_{MC}$ is a character stain quantity,
$D_{CC}$ is a character cut quantity,
$D_C$ is a character dissimilarity quantity,
$D_{MB}$ is a background stain quantity,
$D_{CB}$ is a background character quantity,
$D_B$ is a background dissimilarity quantity, and
$D_T$ is a total dissimilarity quantity.

* * * * *